June 12, 1934.  H. T. SEELEY  1,962,943
CONTROL SYSTEM
Filed May 4, 1932
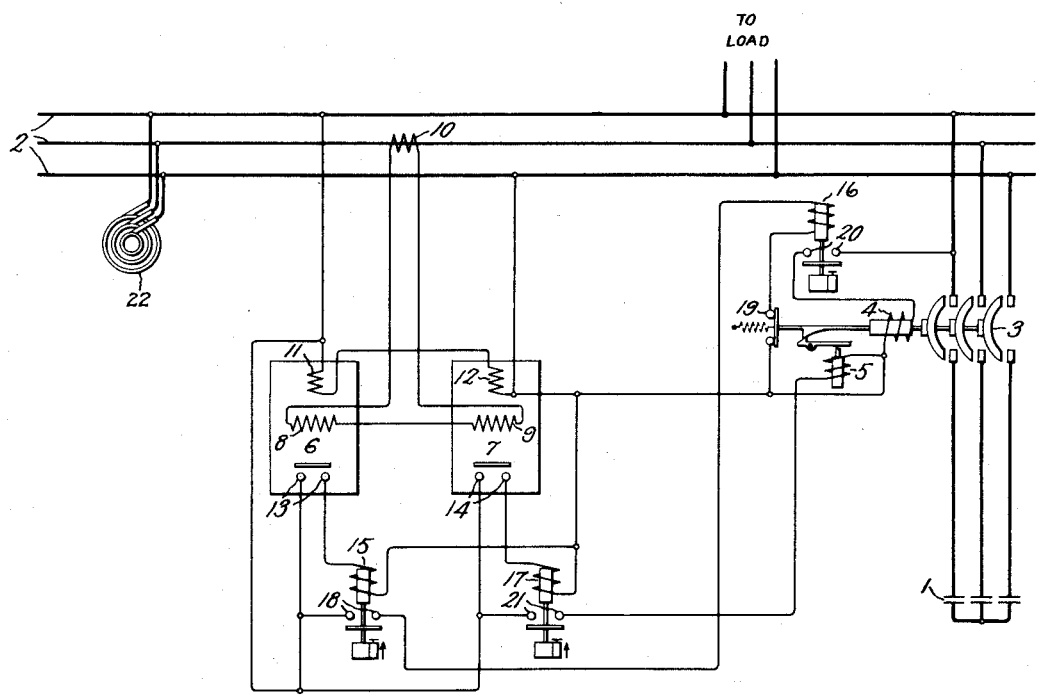
Inventor:
Harold T. Seeley,
by Charles V. Tullar
His Attorney.

Patented June 12, 1934

1,962,943

UNITED STATES PATENT OFFICE 1,962,943

CONTROL SYSTEM

Harold T. Seeley, Yeadon, Pa., assignor to General Electric Company, a corporation of New York Application May 4, 1932, Serial No. 609,292

4 Claims. (Cl. 172—246)

My invention relates to control systems and particularly to a system controlling the connection of a suitable reactive means such as a reactor or a capacitor to an alternating current circuit so as to maintain the power factor thereof substantially constant at a predetermined value and its object is to provide an improved arrangement for accomplishing this result.

In systems of alternating current distribution which supply lagging power factor loads, the power factor and voltage of the system can be materially improved by connecting a capacitor of the proper size to the system so that the leading current taken by the capacitor compensates for the lagging current of the load. Heretofore, the automatic connection and disconnection of such a capacitor has been effected in response to the voltage or power factor of the alternating current circuit. It has been found in practice, however, that when such control means are used the connection of the capacitor under light load conditions may change the voltage or power factor in such a manner that the control means operates immediately to effect the disconnection of the capacitor. This results, therefore, in the periodic opening and closing, or pumping as it is commonly called, of the switch which connects the capacitor to the circuit.

In accordance with my invention I prevent this pumping by controlling the operation of the switch which connects the capacitor to the circuit in response to a predetermined reactive component of the current in the circuit instead of in response to the voltage of power factor thereof.

My invention will be better understood from the following description when taken in connection with the accompanying drawing and its scope will be pointed out in the appended claims.

Referring to the accompanying drawing which diagrammatically shows an arrangement embodying my invention, 1 represents a capacitor which is adapted to be connected to a three-phase alternating current circuit 2 by means of a circuit breaker 3 which may be of any suitable type, examples of which are well known in the art. As shown, the circuit breaker 3 is of the well-known latched in type and is provided with a closing coil 4 and a tripping coil 5. The circuit 2 may be supplied with current from any suitable source such as a generator 22.

For automatically controlling the closing and opening of the circuit breaker 3, I provide in accordance with my invention two volt-ampere relays 6 and 7. Each of these relays is connected in any suitable manner, examples of which are well-known in the art, so that it responds to a predetermined number of reactive volt-amperes in the circuit 2. As shown in the drawing, the current coil 8 of the relay 6 and the current coil 9 of the relay 7 are connected in series with the secondary winding of a current transformer 10, the primary winding of which is connected in series with one of the conductors of the circuit 2. The voltage winding 11 of the relay 6 and the voltage winding 12 of the relay 7 are connected in series across one phase of the supply circuit 2. In the arrangement shown in the drawing, it is assumed that it is desired to maintain substantially unity power factor. Therefore, the reactive volt-ampere relay 6 is designed so that it closes its contacts 13 in response to a predetermined number of lagging reactive volt-amperes and the relay 7 is arranged to close its contacts 14 in response to a predetermined number of leading reactive volt-amperes. The relay 6 is arranged so that when it closes its contacts 13, an energizing circuit is completed for a time relay 15 which, in turn, after a predetermined time completes an energizing circuit for the control relay 16 associated with the circuit breaker 3. When the control relay 16 is energized, it completes an energizing circuit for the closing coil 4 to effect the closing of the circuit breaker. When the reactive volt-ampere relay 7 closes its contacts 14, an energizing circuit is completed for a time relay 17 which, in turn, after a predetermined time interval completes an energizing circuit for the tripping coil 5 to effect the opening of the circuit breaker 3.

The operation of the arrangement shown in the drawing is as follows: Let it be assumed that while the switch 3 is open, the lagging reactive volt-amperes in the circuit 2 increase to such a value that the relay 6 closes its contacts 13. A circuit is then completed across one phase of the circuit 2 for the operating coil of the time relay 15. After the relay 15 has been energized for a predetermined time, it closes its contacts 18 and completes across one phase of the circuit 2 an energizing circuit for the auxiliary relay 16. This circuit also includes the auxiliary contacts 19 on the circuit breaker 3. The auxiliary relay 16 by closing its contacts 20 completes an energizing circuit across one phase of the circuit 2 for the closing coil 4 so that the circuit breaker 3 is closed to connect the capacitor 1 across the supply circuit 2.

So long as the leading reactive volt-amperes remain below a predetermined value, the circuit breaker 3 remains closed. When however the leading reactive volt-amperes exceed this predetermined value after the closing of the circuit breaker 3, the relay 7 closes its contacts 14 and completes an energizing circuit for the operating winding of the time relay 17. A predetermined time after the operating winding of the relay 17 is closed, the relay closes its contacts 21 and completes an energizing circuit for the tripping coil 5 so that the circuit breaker 3 is opened to disconnect the condenser 1 from the supply circuit 2.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In combination, an electric circuit, reactive means, means responsive to a predetermined reactive component of the current in said circuit for effecting the connection of said reactive means to said circuit, and means responsive to a different predetermined reactive component of said current for effecting the disconnection of said reactive means from said circuit.

2. In combination, an electric circuit, reactive means, means responsive to a predetermined number of reactive volt-amperes in said circuit for effecting the connection of said reactive means to said circuit, and means responsive to a different predetermined number of reactive volt-amperes in said circuit for effecting the disconnection of said reactive means from said circuit.

3. In combination, an electric circuit, a capacitor, means responsive to a predetermined number of lagging reactive volt-amperes in said circuit for effecting the connection of said capacitor to said circuit, and means responsive to a predetermined number of leading reactive volt-amperes for effecting the disconnection of said capacitor from said circuit.

4. In combination, an electric circuit, a capacitor, means including a relay responsive to one value of reactive volt-amperes in said circuit for effecting the connection of said capacitor to said circuit, and means including another relay responsive to a different value of reactive volt-amperes in said circuit for effecting the disconnection of said capacitor from said circuit.

HAROLD T. SEELEY.